US012128376B2

(12) United States Patent
Nguyen et al.

(10) Patent No.: US 12,128,376 B2
(45) Date of Patent: Oct. 29, 2024

(54) METHOD FOR PRODUCING SILVER-COATED POLYMER MICROSPHERE

(71) Applicant: MK HIGH TECHNOLOGY JOINT STOCK COMPANY, Vinh Phuc Province (VN)

(72) Inventors: Khang Trong Nguyen, Hanoi (VN); Thuat Tran Nguyen, Hanoi (VN)

(73) Assignee: MK HIGH TECHNOLOGY JOINT STOCK COMPANY, Vinh Phuc Province (VN)

( * ) Notice: Subject to any disclaimer, the term of this patent is extended or adjusted under 35 U.S.C. 154(b) by 0 days.

(21) Appl. No.: 17/987,755

(22) Filed: Nov. 15, 2022

(65) Prior Publication Data

US 2023/0356170 A1 Nov. 9, 2023

(30) Foreign Application Priority Data

May 4, 2022 (VN) .............................. 1-2022-02798

(51) Int. Cl.
*B01J 13/22* (2006.01)
(52) U.S. Cl.
CPC ..................... *B01J 13/22* (2013.01)

(58) Field of Classification Search
None
See application file for complete search history.

(56) References Cited

U.S. PATENT DOCUMENTS 5,677,104 A * 10/1997 Hirai .................... G03C 8/4066
430/248
9,093,192 B2   7/2015 Nakabayashi et al.
2013/0140501 A1* 6/2013 Nakabayashi .......... H01B 1/12
252/514

* cited by examiner

*Primary Examiner* — Jeffrey D Washville
(74) *Attorney, Agent, or Firm* — HSML P.C.

(57) ABSTRACT

A method for producing a silver-coated polymer microsphere includes admixing a polymer microsphere with a dipping solution containing water, a protic solvent, a tin compound, and hydrochloric acid and subsequently subjecting a resultant first mixture to ultrasonication so that a tin adsorption layer is formed on a surface of the polymer microsphere, immersing the polymer microsphere having the tin adsorption layer in a silver complex solution to obtain a second mixture, diluting the second mixture with water to form a diluted second mixture, and dropping a reducing solution into the diluted second mixture, so that a silver coating layer is formed on a surface of the tin adsorption layer of the polymer microsphere.

10 Claims, 4 Drawing Sheets

METHOD FOR PRODUCING SILVER-COATED POLYMER MICROSPHERE

CROSS-REFERENCE TO RELATED APPLICATION

This application claims priority of Vietnam Invention Patent Application No. 1-2022-02798, filed on May 4, 2022.

FIELD

The present disclosure relates to a method for producing a silver-coated polymer microsphere.

BACKGROUND

Conductive microspheres play a central role in making anisotropic conductive films (ACFs). The conductive microspheres enable the vertical conduction from a bottom pad to a top pad when they are dispersed in a plane. Lateral conduction is not possible since the conductive microspheres do not touch each other. The conductive microspheres can be made of a metal element (such as copper, nickel, silver, or gold), a metal mixture, or a metal-shell polymer-core structure.

When a certain compressing ability in the vertical conductive direction is needed, metal-shell polymer-core microspheres are mostly desirable. Applications of ACFs are very wide, from a screen of a smartphone or a smartwatch to a large area display and to a smart card, where there is a need of a binding film which facilitates the vertical conduction but not lateral conduction.

Metal-shell polymer-core microspheres can be classified according to the types of metal and polymer-core (also known as resin core), as well as the microsphere size. Compared with the conductive microspheres required by smart cards, smartphone screens require smaller conductive microspheres. Therefore, the microsphere size is the main factor that affects the applicability of ACFs in the electronics industry.

Nickel, gold, and silver are the metals most commonly used to prepare metal-shell polymer-core microspheres. The use of a combination of nickel and gold is to reduce the cost of raw materials. Nevertheless, since silver is not as expensive as gold and is easier for plating around polymer microspheres, silver can serve as a substitute for gold. Electroless silver plating processes are commonly used to produce metal-shell polymer-core microspheres. Generally, the electroless plating of silver onto a polymer core, such as a poly(methyl methacrylate) (PMMA) core, is performed according to the following steps: subjecting the PMMA core to a pretreatment using an aqueous solution containing a tin compound to sensitize the surface of the PMMA core, followed by plating of silver.

In recent years, a number of studies have aimed at optimizing the electroless silver plating processes. For instance, U.S. Pat. No. 9,093,192 B2 discloses a method for producing a silver-coated spherical resin, which includes a process of subjecting a spherical resin to a pretreatment using an aqueous solution of a tin compound, and a subsequent process of subjecting the spherical resin to an electroless silver plating using a reducing agent. During the pretreatment, a temperature of the aqueous solution of the tin compound is set to be in a range of 30° C. to 45° C.

In spite of the aforesaid, there is still a need to provide a more efficient method for producing a silver-coated polymer microsphere.

SUMMARY

Therefore, the present disclosure provides a method for producing a silver-coated polymer microsphere, which can alleviate at least one of the drawbacks of the prior art. The method includes:

(a) admixing a polymer microsphere with a dipping solution containing water, a protic solvent, a tin compound, and hydrochloric acid, followed by subjecting a first mixture thus formed to an ultrasonication treatment, so that a tin adsorption layer is formed on a surface of the polymer microsphere;

(b) immersing the polymer microsphere having the tin adsorption layer obtained in step (a) in a silver complex solution, so as to obtain a second mixture;

(c) diluting the second mixture obtained in step (b) with water, so as to form a diluted second mixture; and (d) dropping a reducing solution into the diluted second mixture obtained in step (c), so that a silver coating layer is formed on a surface of the tin adsorption layer of the polymer microsphere.

BRIEF DESCRIPTION OF THE DRAWINGS

The above and other objects, features and advantages of the present disclosure will become apparent with reference to the following detailed description and the exemplary embodiments taken in conjunction with the accompanying drawings, in which.

DETAILED DESCRIPTION

Figure 1:
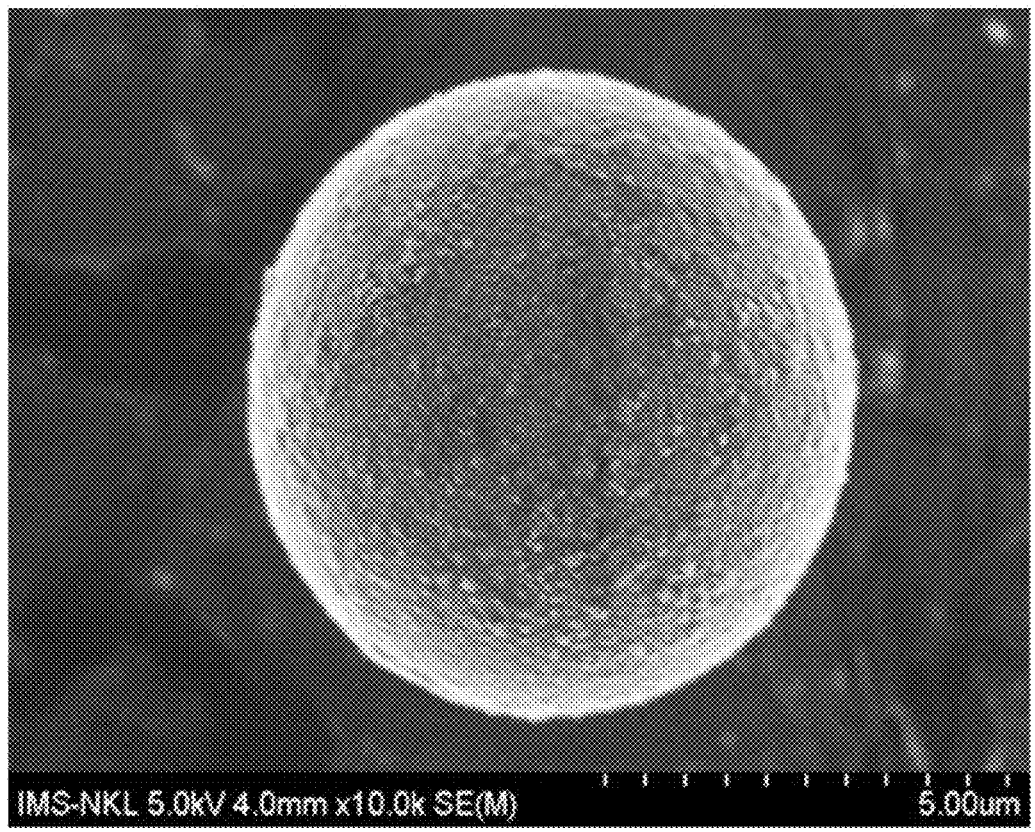
FIG. 1 shows the morphological observation result of the tin-adsorbing PMMA microsphere which is present in the second mixture of Example 12, infra.

It is to be understood that, if any prior art publication is referred to herein, such reference does not constitute an admission that the publication forms a part of the common general knowledge in the art, in Vietnam or any other country.

For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for producing a silver-coated polymer microsphere, which includes:

(a) admixing a polymer microsphere with a dipping solution containing water, a protic solvent, a tin compound, and hydrochloric acid, followed by subjecting a first mixture thus formed to an ultrasonication treatment, so that a tin adsorption layer is formed on a surface of the polymer microsphere;

(b) immersing the polymer microsphere having the tin adsorption layer obtained in step (a) in a silver complex solution, so as to obtain a second mixture;

(c) diluting the second mixture obtained in step (b) with water, so as to form a diluted second mixture; and (d) dropping a reducing solution into the diluted second mixture obtained in step (c), so that a silver coating layer is formed on a surface of the tin adsorption layer of the polymer microsphere.

According to the present disclosure, in step (a), the dipping solution may have a temperature ranging from 0° C. to 30° C.

According to the present disclosure, in step (a), the polymer microsphere may be made from a polymer selected from the group consisting of ethylene vinyl acetate (EVA), low density polyethylene (LDPE), high density polyethylene (HDPE), polyvinyl chloride (PVC), polyvinylidene chloride (PVDC), polytetrafluoroethylene (PTFE), polypropylene (PP), polystyrene (PS), polyisobutylene (PIB), polyvinylpyridine, polybutadiene (BR), polyvinyl acetate (PVA), polyvinyl alcohol (PVAL), polyvinyl butyral (PVB), polyvinyl formal (PVF), polyvinyl ether, polyvinyl pyrrollidone, polyvinyl carbazole, polyethylene glycol (PEG), polypropylene glycol (PPG), epoxy resin, polyphenylene oxide (PPO), polyester (such as polyethylene terephthalate (PET), polybutylene terephthalate (PET), phenol-formaldehyde (PF) resin, urea-formaldehyde (UF) resin, melamine-formaldehyde (MF) resin, polyphenylene sulfide (PPS), polybenzimidazole (PBI), and poly(methyl methacrylate) (PMMA)), and combinations thereof.

According to the present disclosure, in step (a), the protic solvent may be selected from the group consisting of isopropanol, methanol, ethanol, acetic acid, citric acid, n-butanol, formic acid, boric acid, nitromethane, and combinations thereof.

According to the present disclosure, in step (a), a volume ratio of the protic solvent to water ranges from 0.5:1 to 4:1.

According to the present disclosure, in step (a), the tin compound may be selected from the group consisting of stannous chloride ($SnCl_2$), stannous fluoride ($SnF_2$), stannous bromide ($SnBr_2$), stannous iodide ($SnI_2$), and combinations thereof.

In certain embodiments, in step (a), the dipping solution contains hydrochloric acid (HCl) at a concentration ranging from 0.5 M to 2 M.

In certain embodiments, in step (b), the silver complex solution contains silver at a concentration ranging from 1 M to 4 M.

According to the present disclosure, in step (b), the polymer microsphere having the tin adsorption layer as obtained in step (a) may be immersed in the silver complex solution for a time period ranging from 1 hour to 7 hours.

According to the present disclosure, in step (c), the volume of water used to dilute the second mixture may be 1 to 50 times the volume of the second mixture.

According to the present disclosure, in step (b), the silver complex solution may contain an additive selected from the group consisting of nicotinic acid (NA), 5,5-dimethylhydantoin (DMH), cetyltrimethylammonium bromide (CTAB), thiosulfate, hydantoin, uracil, succinimide, sulfite, thiourea, N-(2-hydroxyethyl)ethylenediamine-N,N',N'-triacetic acid (HEDTA), 2-hydroxypyridine, pyrrolidinium, phosphonium, and combinations thereof.

In certain embodiments, in step (b), the additive has a concentration ranging from 0.0001 M to 0.1 M.

According to the present disclosure, in step (b), the silver complex solution may contain a surfactant selected from the group consisting of sodium dodecyl sulfate (SDS), Triton X-100, poly(vinylpyrrolidone) (PVP), dioctyl sodium sulfosuccinate, sulfonates, nonoxynol-9, polysorbate, poloxamer, tergitol, antarox, and combinations thereof.

In certain embodiments, in step (b), a weight ratio of the surfactant to the polymer microsphere ranges from 1:25 to 1:100.

According to the present disclosure, in step (d), the reducing solution may be selected from the group consisting of a formaldehyde (HCHO) solution, a sodium borohydride ($NaBH_4$) solution, and a combination thereof.

In certain embodiments, in step (d), the reducing solution may have a concentration ranging from 0.01 M to 0.5 M.

According to the present disclosure, in step (d), dropping the reducing solution into the diluted second mixture obtained in step (c) may be performed for a time period ranging from 1 hour to 5 hours.

The present disclosure will be further described by way of the following examples. However, it should be understood that the following examples are intended solely for the purpose of illustration and should not be construed as limiting the present disclosure in practice.

EXAMPLES

Preparation of Silver-Coated Poly(Methyl Methacrylate) (PMMA) Microsphere:

Each of the silver-coated PMMA microspheres of Examples 1 to 14 (abbreviated as EX1 to EX14) was prepared using the corresponding PMMA microsphere, dipping solution, silver complex solution, reducing solution, and operation conditions shown in Tables 1 to 4, respectively, and the preparation procedures of these silver-coated PMMA microspheres are described as follows.

First, the PMMA microsphere was mixed with the dipping solution, followed by subjecting a first mixture thus formed to an agitation treatment (i.e., ultrasonication or stirring with a magnetic stirrer) at 20° C. for 2 hours, so that a tin adsorption layer was formed on a surface of the PMMA microsphere.

Next, the first mixture was subjected to filtration using a filter (pore size: 10-15 µm) (BEIMU 103 with standard GB/T 1914-2017), and the PMMA microsphere having the tin adsorption layer (hereinafter referred to as "tin-adsorbing PMMA microsphere") was collected, and was then rinsed with deionized water, followed by drying at ambient temperature or in an oven. The resultant dried tin-adsorbing PMMA microsphere was immersed in the silver complex solution (also known as silver plating solution) at 20° C. for a given period of time, so as to obtain a second mixture.

Thereafter, the second mixture was diluted with water, so as to form a diluted second mixture. Subsequently, the reducing solution was dropped into the diluted second mixture at 20° C. for a given period of time, so that a silver coating layer was formed on a surface of the tin adsorption layer of the PMMA microsphere.

A thus formed third mixture containing a silver-coated PMMA microsphere was maintained at 20° C. for 1 hour to 2 hours, followed by filtration using a filter (pore size: 10-15 µm) (BEIMU 103 with standard GB/T 1914-2017), so as to obtain the silver-coated PMMA microsphere. Next, the silver-coated PMMA microsphere was rinsed with deionized water, followed by drying at ambient temperature or in an oven. Each of the resultant dried silver-coated PMMA microspheres of EX 1 to EX14 was subjected to the following analyses.

TABLE 1

| Silver-coated PMMA microsphere | Dipping solution | | | | PMMA microsphere | |
|---|---|---|---|---|---|---|
| | H₂O (mL) | Methanol (serving as a protic solvent) (mL) | SnCl₂·2H₂O (g) | HCl (mL) | Amount (g) | Particle size (μm) |
| EX1[a] | 500 | 0 | 16.7 | 50 | 50 | 3-4.5 |
| EX2[a] | 250 | 250 | 16.7 | 50 | 50 | 3-4.5 |
| EX3[a] | 250 | 250 | 16.7 | 50 | 50 | 3-4.5 |
| EX4[b] | 500 | 0 | 16.7 | 25 | 25 | 6-7 |
| EX5[b] | 500 | 0 | 16.7 | 25 | 25 | 6-7 |
| EX6[b] | 1000 | 0 | 56 | 84 | 84 | 1-30 |
| EX7[b] | 2000 | 0 | 66.8 | 100 | 100 | 8-9 |
| EX8[b] | 1000 | 1000 | 66.8 | 100 | 100 | 8-9 |
| EX9[b] | 500 | 1500 | 66.8 | 100 | 100 | 8-9 |
| EX10[b] | 1000 | 1000 | 134 | 200 | 100 | 8-9 |
| EX11[b] | 1000 | 1000 | 134 | 200 | 100 | 11-12 |
| EX12[b] | 1000 | 1000 | 134 | 200 | 100 | 5-20 |
| EX13[b] | 1000 | 1000 | 134 | 200 | 100 | 5-20 |
| EX14[b] | 1000 | 1000 | 134 | 200 | 100 | 5-20 |

[a]The agitation treatment was performed by stirring with a magnetic stirrer.
[b]The agitation treatment was performed by ultrasonication.

TABLE 2

| Silver-coated PMMA microsphere | Silver complex solution | | | Additive | | Surfactant |
|---|---|---|---|---|---|---|
| | H₂O (mL) | NH₃ (ml) | AgNO₃ (g) | Nicotinic acid (NA) (g) | 5,5-dimethylhydantoin (DMH) (g) | |
| EX1 | 40 | 80 | 84 | 0.011 | 0.011 | 0.7 mL of Triton X-100 |
| EX2 | 40 | 80 | 84 | 0 | 0 | 0 |
| EX3 | 40 | 80 | 84 | 0.011 | 0.011 | 0.7 mL of Triton X-100 |
| EX4 | 100 | 50 | 21 | 0 | 0 | 0 |
| EX5 | 100 | 70 | 21 | 0 | 0 | 0 |
| EX6 | 1000 | 145 | 140 | 0.34 | 0.34 | 0 |
| EX7 | 450 | 160 | 168 | 0.09 | 0.09 | 0 |
| EX8 | 450 | 160 | 168 | 0.09 | 0.09 | 0 |
| EX9 | 450 | 160 | 168 | 0.09 | 0.09 | 0 |
| EX10 | 450 | 160 | 168 | 0.09 | 0.09 | 0.67 g of poly(vinylpyrrolidone) (PVP) |
| EX11 | 900 | 160 | 168 | 0.09 | 0.09 | 1.18 g of sodium dodecyl sulfate (SDS) |
| EX12 | 450 | 160 | 168 | 0.09 | 0.09 | 3 mL of Triton X-100 |
| EX13 | 450 | 160 | 168 | 0.09 | 0.09 | 3 mL of Triton X-100 |
| EX14 | 80 | 160 | 168 | 0.09 | 0.09 | 3 mL of Triton X-100 |

TABLE 3

| Silver-coated PMMA microsphere | Reducing solution | | | |
|---|---|---|---|---|
| | H₂O (mL) | Ethylenediaminetetraacetic acid (EDTA) (g) | 0.26M HCHO solution (mL) | NaOH (g) |
| EX1 | 140 | 1.54 | 7 | 3.5 |
| EX2 | 140 | 1.54 | 7 | 3.5 |
| EX3 | 140 | 1.54 | 7 | 3.5 |
| EX4 | 140 | 0.77 | 3.5 | 1.75 |
| EX5 | 140 | 0.77 | 3.5 | 1.75 |
| EX6 | 470 | 2.59 | 11.8 | 5.9 |
| EX7 | 560 | 3.08 | 14 | 7 |
| EX8 | 560 | 3.08 | 14 | 7 |
| EX9 | 560 | 3.08 | 14 | 7 |
| EX10 | 560 | 3.08 | 14 | 7 |
| EX11 | 560 | 3.08 | 14 | 7 |
| EX12 | 560 | 3.08 | 14 | 7 |
| EX13 | 280 | 3.08 | 14 | 7 |
| EX14 | 280 | 3.08 | 14 | 7 |

TABLE 4

| Silver-coated PMMA microsphere | Operation conditions | | | |
|---|---|---|---|---|
| | Immersing time of silver complex solution (min) | Temperature of silver complex solution (° C.) | Dropping time of reducing solution (min) | Temperature of reducing solution (° C.) |
| EX1 | 20 | 20 | 180 | 20 |
| EX2 | 20 | 20 | 180 | 20 |
| EX3 | 20 | 20 | 180 | 20 |
| EX4 | 5 | 20 | 60 | 20 |
| EX5 | 5 | 20 | 60 | 20 |
| EX6 | 5 | 20 | 60 | 20 |
| EX7 | 5 | 20 | 180 | 20 |
| EX8 | 20 | 20 | 180 | 20 |
| EX9 | 20 | 20 | 180 | 20 |
| EX10 | 20 | 20 | 180 | 20 |
| EX11 | 20 | 20 | 180 | 20 |
| EX12 | 20 | 20 | 180 | 20 |
| EX13 | 20 | 20 | 180 | 20 |
| EX14 | 20 | 20 | 180 | 20 |

Property Evaluation:

A. Measurement of Resistance:

The silver-coated PMMA microsphere of the respective one of EX1 to EX14 was compressed under different pressures (i.e., 350 bar and 700 bar) in a vertical direction using a compression tester equipped with an electric resistance measuring device (Agilent, U1272A), and the resistance of the respective silver-coated PMMA microsphere in the compression direction was measured. In addition, the resistance of the respective silver-coated PMMA microsphere before compression was also measured.

The results of the measurement of resistance are shown in Table 5. It can be seen from Table 5 that the silver-coated PMMA microsphere of the respective one of EX8, EX10, EX12 to EX14 exhibited a resistance value of less than 1000Ω before compression.

Furthermore, the silver-coated PMMA microsphere of the respective one of EX8, EX9, EX12 to EX14 exhibited a resistance value of less than 5Ω after compression under a compression rate of 25%. In particular, the silver-coated PMMA microsphere of the respective one of EX8, EX9, EX11 to EX14 exhibited a resistance value of less than 2Ω after compression under a compression rate of 50%.

TABLE 5

| Silver-coated PMMA microsphere | Before compression | 350 bar[a] | 700 bar[b] |
|---|---|---|---|
| | | Resistance (Ω) | |
| EX1 | Up to $18 \times 10^6$ | Up to $18 \times 10^6$ | Up to $18 \times 10^6$ |
| EX2 | Up to $7 \times 10^6$ | Up to $7 \times 10^6$ | Up to $7 \times 10^6$ |
| EX3 | Up to $16 \times 10^6$ | Up to $16 \times 10^6$ | Up to $16 \times 10^6$ |
| EX4 | Up to $1 \times 10^6$ | Up to $1 \times 10^6$ | Up to $1 \times 10^6$ |
| EX5 | Up to $1 \times 10^6$ | Up to $1 \times 10^6$ | Up to $1 \times 10^6$ |
| EX6 | $5.6 \times 10^6$ | $3.2 \times 10^6$ | $1.5 \times 10^6$ |
| EX7 | $9 \times 10^3$ | 10.3 | 9.1 |
| EX8 | 178 | 2.8 | 0.68 |
| EX9 | $186 \times 10^3$ | 2.8 | 0.9 |
| EX10 | $0.3 \times 10^3$ | 22 | 3.7 |
| EX11 | $11 \times 10^3$ | 5.5 | 0.6 |
| EX12 | 315 | 4 | 1.9 |
| EX13 | 109 | 3 | 0.9 |
| EX14 | 40 | 3 | 1.5 |

[a]350 bar was equivalent to a compression rate of 25% (i.e., the particles size was compressed by 25%).
[b]700 bar was equivalent to a compression rate of 50% (i.e., the particles size was compressed by 50%).

B. Morphological Analysis:

The tin-adsorbing PMMA microsphere which was present in the second mixture of EX12 (i.e., the tin-adsorbing PMMA microsphere obtained after immersing in the silver complex solution) and the silver-coated PMMA microspheres of EX1, EX2, and EX12 were subjected to morphological analysis using a scanning electron microscope (S-4800, Hitachi) under an acceleration voltage of 5 kV.

The results are shown in FIGS. 1 to 4. Referring to FIG. 1, after immersing the dried tin-adsorbing PMMA microsphere in the silver complex solution, a thin silver-coated layer was observed.

Figure 2:
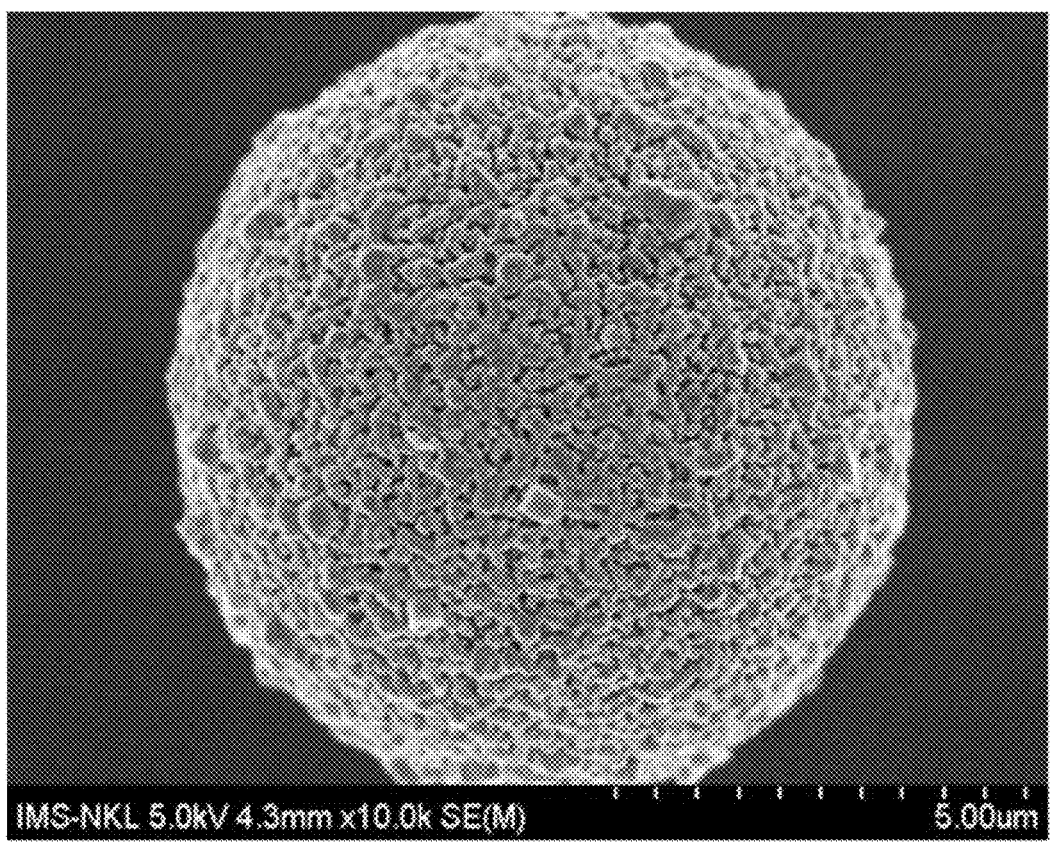
FIG. 2 shows the morphological observation result of the silver-coated PMMA microsphere of Example 12, infra.

Referring to FIG. 2, a thick silver-coated layer was formed on the silver-coated PMMA microspheres of EX12 obtained after the electroless silver plating processes. By virtue of the thick silver-coated layer, the silver-coated PMMA microsphere of EX12 exhibited low resistance values as shown in Table 5.

Figure 3:
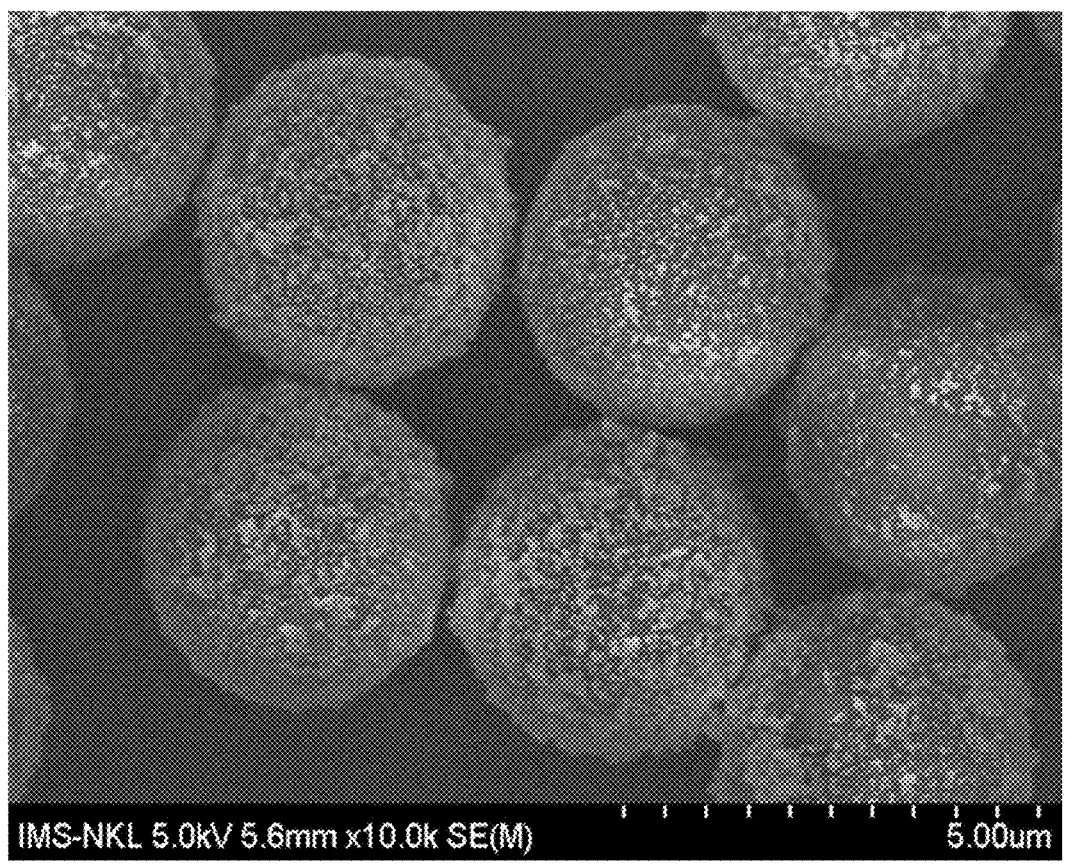
FIG. 3 shows the morphological observation result of the silver-coated PMMA microsphere of Example 1, infra.
Figure 4:
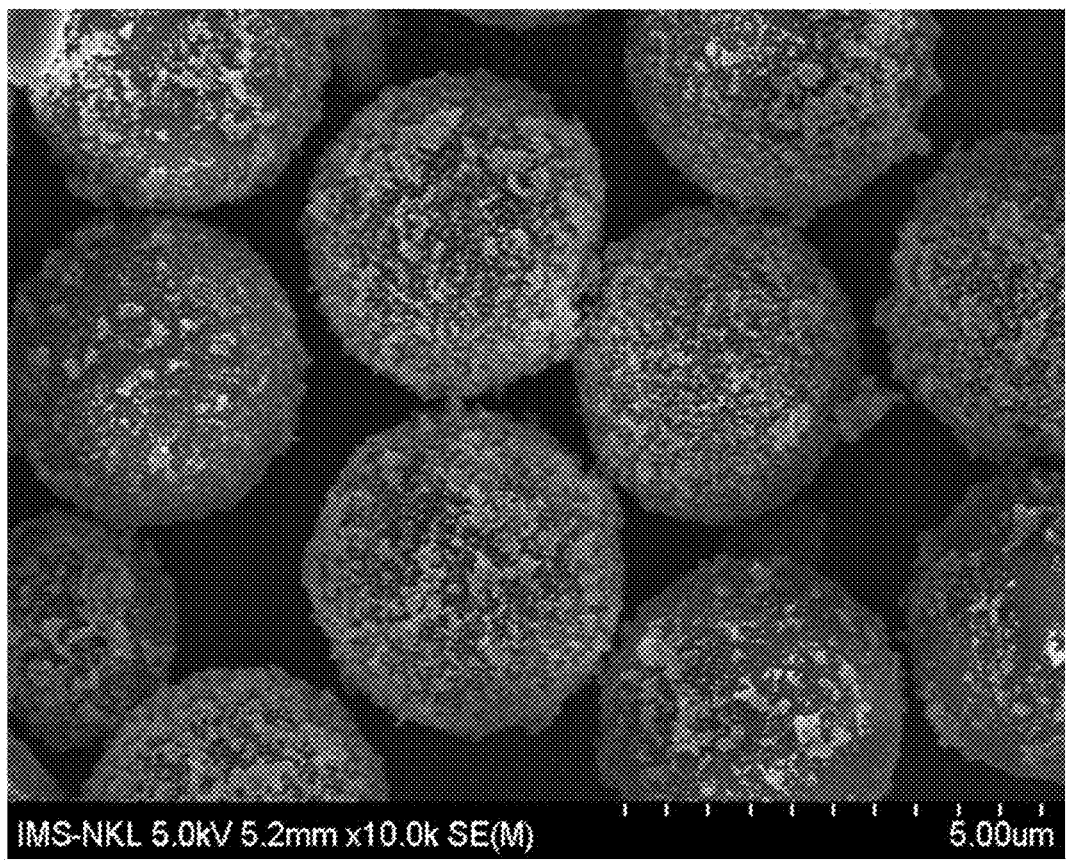
FIG. 4 shows the morphological observation result of the silver-coated PMMA microsphere of Example 2, infra.

FIGS. 3 and 4 respectively show the silver-coated PMMA microspheres of EX1 and EX2 obtained after the electroless silver plating processes. It can be seen from FIGS. 3 and 4 that unconnected patches of silver particles were precipitated on the surface of the PMMA microsphere, the plated silver layer was not well formed. Thus, the silver-coated PMMA microspheres of EX1 and EX2 exhibited very high values of resistance as shown in Table 5.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for producing a silver-coated polymer microsphere, comprising:
   (a) admixing a polymer microsphere with a dipping solution containing water, a protic solvent, a tin compound, and hydrochloric acid, followed by subjecting a first mixture thus formed to an ultrasonication treatment, so that a tin adsorption layer is formed on a surface of the polymer microsphere;
   (b) immersing the polymer microsphere having the tin adsorption layer obtained in step (a) in a silver complex solution, so as to obtain a second mixture;
   (c) diluting the second mixture obtained in step (b) with water, so as to form a diluted second mixture, wherein the volume of water used to dilute the second mixture is 1 to 50 times the volume of the second mixture; and
   (d) dropping a reducing solution into the diluted second mixture obtained in step (c), so that a silver coating layer is formed on a surface of the tin adsorption layer of the polymer microsphere.

2. The method according to claim 1, wherein in step (a), the dipping solution has a temperature ranging from 0° C. to 30° C.

3. The method according to claim 1, wherein in step (a), the polymer microsphere is made from a polymer selected from the group consisting of ethylene vinyl acetate (EVA), low density polyethylene (LDPE), high density polyethylene (HDPE), polyvinyl chloride (PVC), polyvinylidene chloride (PVDC), polytetrafluoroethylene (PTFE), polypropylene (PP), polystyrene (PS), polyisobutylene (PIB), polyvinylpyridine, polybutadiene (BR), polyvinyl acetate (PVA), polyvinyl alcohol (PVAL), polyvinyl butyral (PVB), polyvinyl formal (PVF), polyvinyl ether, polyvinyl pyrrollidone, polyvinyl carbazole, polyethylene glycol (PEG), polypropylene glycol (PPG), epoxy resin, polyphenylene oxide (PPO), polyethylene terephthalate (PET), polybutylene terephthalate (PBT), phenol-formaldehyde (PF) resin, urea-formaldehyde (UF) resin, melamine-formaldehyde (MF) resin, polyphenylene sulfide (PPS), polybenzimidazole (PBI), poly(methyl methacrylate)(PMMA), and combinations thereof.

4. The method according to claim 1, wherein in step (a), the protic solvent is selected from the group consisting of isopropanol, methanol, ethanol, acetic acid, citric acid, n-butanol, formic acid, boric acid, nitromethane, and combinations thereof.

5. The method according to claim 1, wherein in step (a), a volume ratio of the protic solvent to water ranges from 0.5:1 to 4:1.

6. The method according to claim 1, wherein in step (a), the tin compound is selected from the group consisting of stannous chloride, stannous fluoride, stannous bromide, stannous iodide, and combinations thereof.

7. The method according to claim 1, wherein in step (b), the silver complex solution contains silver at a concentration ranging from 1 M to 4 M.

8. The method according to claim 1, wherein in step (b), the silver complex solution contains an additive selected from the group consisting of nicotinic acid (NA), 5,5-dimethylhydantoin (DMH), cetyltrimethylammonium bromide (CTAB), thiosulfate, hydantoin, uracil, succinimide, sulfite, thiourea, N-(2-hydroxyethyl)ethylenediamine-N,N',N'-triacetic acid (HEDTA), 2-hydroxypyridine, pyrrolidinium, phosphonium, and combinations thereof.

9. The method according to claim 1, wherein in step (b), the silver complex solution contains a surfactant selected from the group consisting of sodium dodecyl sulfate (SDS), polyethylene glycol p-(1,1,3,3-tetramethylbutyl)-phenyl ether, poly(vinylpyrrolidone) (PVP), dioctyl sodium sulfosuccinate, sulfonates, nonoxynol-9, polysorbate, poloxamer, tergitol, antarox, and combinations thereof.

10. The method according to claim 1, wherein in step (d), the reducing solution is selected from the group consisting of a formaldehyde (HCHO) solution, a sodium borohydride ($NaBH_4$) solution, and a combination thereof.

* * * * *